C. W. WARD.
TROLLEY OPERATED CONTACT.
APPLICATION FILED FEB. 4, 1911.
1,151,981.  Patented Aug. 31, 1915.
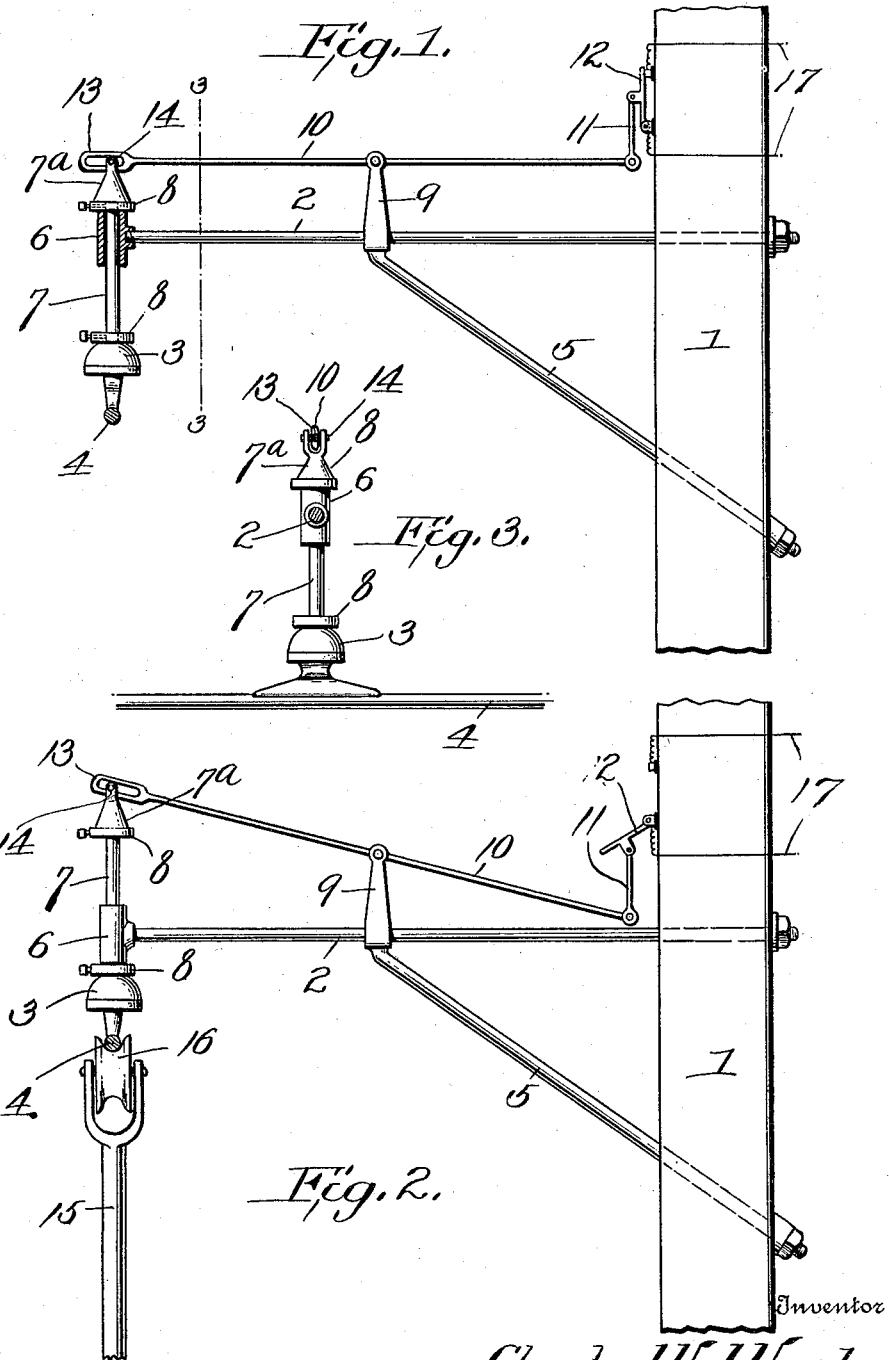
Witnesses
Oliver W. Holmes
E. B. McBach
Inventor
Charles W. Ward
By Chas E Brock
Attorney

UNITED STATES PATENT OFFICE.

CHARLES W. WARD, OF EAST ST. LOUIS, ILLINOIS.

TROLLEY-OPERATED CONTACT.

1,151,981. Specification of Letters Patent. Patented Aug. 31, 1915.

Application filed February 4, 1911. Serial No. 606,565.

*To all whom it may concern:*

Be it known that I, CHARLES W. WARD, a citizen of the United States, residing at East St. Louis, in the county of St. Clair and State of Illinois, have invented a new and useful Improvement in Trolley-Operated Contacts, of which the following is a specification.

This invention relates to a device for making and breaking an electric circuit, by utilizing the rise and fall of a trolley wire as the trolley wheel travels along it, the wire being connected to certain mechanism adapted to operate an electric switch. The switch so operated may form a part of a signal of any kind, and may be a part of a block signal system, or it may be part of a system of signals arranged at stations, or at car barns for the purpose of showing the location and movements of the cars. It will be understood however that the signal system itself does not form a part of this application but is referred to only for the purpose of showing the utility of the switch to be hereafter described.

I have found that the spring upon the ordinary trolley pole is strong enough to lift the ordinary wire a distance of about eight inches above its normal level. I am aware that electrical contacts have been made by means of the trolley wheel itself, and this I do not claim, as in my invention the trolley wheel does not come in contact with any part of the operating mechanism, and I avoid all danger of throwing the wheel from the wire, and I also obtain results equally as good no matter what the speed of the car may be.

My invention consists in a vertically movable hanger adapted to be lifted with the wire as the trolley wheel passes beneath it, and mechanism operated by the hanger for the purpose of either opening or closing an electric circuit.

In the accompanying drawings: Figure 1 is a side view of my device, a sleeve being in section, and a trolley wire being shown in cross section. Fig. 2 is a side elevation, showing the wire in cross section and with the parts in the position occupied during the passage of the trolley wheel. Fig. 3 is a section on the line 3—3 of Fig. 1 looking toward the trolley wire.

In illustrating the invention I have shown a form of the device in which the rise of the wire serves to break an electric circuit, but it will be understood that this is a matter of choice, and whether the circuit is made or broken will depend entirely upon the nature of the signal system employed.

In these drawings 1 represents a trolley pole, 2 a horizontally extending supporting arm, 3 a hanger, and 4 a trolley wire. A brace 5 is also employed to aid in supporting the arm 2 and hanger. These parts are of the ordinary construction and are in common use with the exception of the modifications and additions to be now described.

At the outer end of the bar 2 I place a vertically arranged sleeve 6 in which works vertically a hanger rod 7. As the extent to which a trolley wire would be lifted might vary in some cases, according to the size and weight of the wire or the strength of the springs employed in connection with the trolley pole, I place on said rod adjustable collars 8 above and below the sleeve 6, and by adjusting these collars any variation in the extent to which the trolley wheel will lift the wire is taken care of. The upper end of the rod 7 is provided with a suitable cap 7$^a$.

The brace 5 carries at its upper end an upright arm 9 upon which is pivoted a lever 10 to which is pivoted at its inner end a link 11 also pivotally connected to the movable member 12 of any suitable form of switch or other circuit making and breaking mechanism. The outer end of the lever 10 is in the form of a link 13 to which the cap 7$^a$ is loosely connected, as for example, by bifurcating said cap and passing a pin 14 loosely through the link 13. This device is used with the ordinary trolley 16 on pole 15 and when the hanger is moved upwardly by the trolley the rod 7 is moved upwardly in the sleeve 6 and the outer end of the lever 10 is lifted. This throws down the inner end and by means of link 11 opens the switch.

These devices may be arranged at any suitable points along the line and at any desired distance apart. At 17 I have indicated portions of a signal circuit, and it will also be understood that suitable insulation is employed at any points where it may be found necessary.

What I claim is:

1. The combination with a trolley wire and a trolley wire supporting pole, of a horizontally extending bar carried by the pole, a vertically arranged sleeve carried by said bar, a hanger secured to the trolley wire, a hanger rod working upwardly through the sleeve, an electric switch arranged upon the pole, and switch operating means supported from said bar and adapted to be engaged and actuated by the hanger rod.

2. In a device of the character described a vertically movable hanger, a trolley wire supported thereby, an electric switch having a movable member, and an operating lever fixedly pivoted intermediate its ends and having its ends positively connected by articulated joints respectively to said movable member and to said hanger whereby the switch is positively opened and closed through the rise and fall of said trolley wire.

3. In a device of the character described a transversely extending trolley supporting member, a trolley wire supported therefrom for vertical movement with respect thereto, an electric switch located laterally of said trolley wire substantially in the vertical plane of said transversely extending supporting member, and an operating lever for the switch fixedly pivoted intermediate its ends on said supporting member, and having its ends connected respectively with the vertically movable trolley wire and electric switch, whereby the switch is operated through the rise and fall of the trolley wire.

4. A device of the character described comprising a vertically movable trolley wire, an electric knife blade switch located laterally of the vertical plane of the trolley wire, and means positively interconnecting mechanically the trolley wire and the switch whereby the switch is positively opened and closed through rise and fall of the trolley wire, respectively.

5. A device of the character described comprising a trolley wire, a vertically reciprocating hanger therefor, a supporting means for the hanger permitting said reciprocating movement, an electric switch separate from the said support disposed laterally of the hanger and comprising two relatively movable terminal members, and means interconnecting one of said terminal members with said vertically movable hanger to be positively opened and closed through the vertical rise and fall of said trolley wire.

6. A device of the character described comprising a support for the trolley wire, a trolley wire, a hanger therefor directly engaged and supported by said support and adapted to reciprocate vertically with respect thereto, adjustable stops on the hanger predetermining the vertical rise and fall of said hanger, an electric switch positively connected with said hanger and thereby operated to open and closed positions by the vertical rise and fall of said trolley wire.

CHAS. W. WARD.

Witnesses:
MAYME E. WARD.
NICHOLAS R. WHYTE.

Copies of this patent may be obtained for five cents each, by addressing the "Commissioner of Patents, Washington, D. C."